United States Patent
Loveless et al.

[15] 3,668,279

[45] June 6, 1972

[54] PROCESS FOR COUPLING LIVING LITHIOPOLYMERS

[72] Inventors: Frederick C. Loveless, Oakland; Roy E. Hartz, Jefferson, both of N.J.

[73] Assignee: Uniroyal, Inc., New York, N.Y.

[22] Filed: July 6, 1970

[21] Appl. No.: 52,743

Related U.S. Application Data

[63] Continuation-in-part of Ser. No. 885,301, Dec. 15, 1969, abandoned.

[52] U.S. Cl.................260/879, 260/78.4, 260/79.5, 260/93.5, 260/94.7, 260/880
[51] Int. Cl...............C08f 15/00, C08f 7/02, C08d 5/00
[58] Field of Search............260/879, 880, 78.4, 79.5, 93.5, 260/94.7

[56] References Cited

UNITED STATES PATENTS

| | | | |
|---|---|---|---|
| 3,135,716 | 6/1964 | Uraneck et al. | 260/45.5 |
| 3,177,190 | 4/1965 | Hsieh | 260/94.2 |
| 3,427,364 | 2/1969 | Shaw et al. | 260/879 |
| 3,465,065 | 9/1969 | Moss et al. | 260/879 |
| 3,468,972 | 9/1969 | Hsieh | 260/836 |
| 3,492,369 | 1/1970 | Naylor | 260/879 |

*Primary Examiner*—Joseph L. Schoter
*Assistant Examiner*—Richard A. Gaither
*Attorney*—James J. Long

[57] ABSTRACT

Living monolithio polymers are coupled by the action of certain novel coupling agents (e.g., nitrobenzene, sulfur, dimethyl terephthalate, acrylonitrile, maleic anhydride). For example, styrene is first polymerized in benzene with n-butyl lithium catalyst to form a styrene polymer block (S) followed by addition of butadiene to form a butadiene polymer block (B) copolymerized with the styrene block in the form of a living monolithio block copolymer $SB^{\ominus}Li^{\oplus}$. Then a coupling agent, such as nitrobenzene, is added, forming coupled block copolymer SBCSB where C is a residue of the coupling agent. Coupling of three molecules of living polymer is possible with maleic anhydride, or of four molecules with dimethyl terephthalate.

12 Claims, No Drawings

PROCESS FOR COUPLING LIVING LITHIOPOLYMERS

CROSS-REFERENCE TO RELATED APPLICATION

This application is a continuation-in-part of our copending application, Ser. No. 885,301, filed Dec. 15, 1969, now abandoned.

BACKGROUND OF THE INVENTION

1. Field of the Invention

This invention relates to a method of preparing a high polymer by coupling living polymer molecules through a reagent selected from the group consisting of nitrobenzene, sulfur, dimethyl terephthalate, an alpha, beta-unsaturated nitrile, and a monoanhydride.

2. Description of the Prior Art

British Pat. No. 1,014,999, Shell Internationale, published Dec. 31, 1965, discloses the preparation of coupled block copolymers of the ABCBA type by the reaction of living block copolymer anions AB⊖ with a coupling agent C, the coupling agent being a dihalohydrocarbon. Unfortunately, this coupling agent must be employed in no greater than stoichiometric amount, otherwise a chain terminating reaction will tend to predominate over any coupling. In practice it is very difficult to determine what is a proper stoichiometric amount because the actual number of equivalents of living polymer is not usually known exactly. Even when an exact stoichiometric quantity of coupling agent is used, there is still a tendency for undesired side reactions such as dehydrohalogenation to take place, leading to termination rather than coupling.

Carbon monoxide has also been proposed as a coupling agent (Netherlands Pat. No. 66.03845, Shell Internationale, published Sept. 27, 1966) for AB ⊖ living polymers to give ABCBA type polymers, but the use of a gas as a coupling agent (C) has undesirable aspects in some cases.

British Pat. No. 1,103,939, Polymer Corporation, Feb. 21, 1968, discloses the use of carbon dioxide, carbonyl sulfide, and carbon disulfide as coupling agents.

SUMMARY OF THE INVENTION

The invention is based on the discovery that coupling of living monolithium polymer can be achieved in a convenient and efficient manner by the use of a novel coupling agent selected from the group consisting of nitrobenzene, sulfur, dimethyl terephthalate, an alpha, beta-unsaturated nitrile and a monoanhydride.

DETAILS OF THE INVENTION

The polymerization process of the invention is carried out in an inert organic solvent medium, that is, a non-polar solvent, especially a hydrocarbon solvent (whether aliphatic as in the saturated alkanes, e.g., hexane, heptane, etc., cycloaliphatic as in cyclohexane, or aromatic as in benzene, xylene, toluene, and other alkyl benzenes). Many such conventional inert hydrocarbon solvents are well known to those skilled in solution polymerization art. In such non-polar solvent the living polymer exists as anions in ionically associated form and this is the form which is believed to take part in the present coupling reaction. In contrast, in a solvent medium of polar nature, such as a solvent medium containing an ether, the living polymer anions are known to at least partially dissociate. With the dissociated form, side reactions such as chain termination predominate over the desired coupling reaction.

The polymerization catalyst employed in the present process is a conventional organo-monolithium catalyst or initiator and can be represented by the formula RLi where R is a hydrocarbon radical selected from the group consisting of aliphatic, cycloaliphatic and aromatic radicals. Examples include methyllithium, n-butyllithium, n-decyllithium, phenyllithium, naphthyllithium, p-tolyllithium, cyclohexyllithium, and others well known to those skilled in solution polymerization art.

The monomer or monomers employed in the polymerization process of the invention are those which are polymerizable in solution by the action of the organo-monolithium initiator, and may be described as vinyl containing monomers. These monomeric materials include the conjugated dienes containing from four to 12 carbon atoms per molecule and preferably four to eight carbon atoms per molecule. Examples of these compounds include the following: 1,3-butadiene, isoprene, 2,3-dimethyl-1,3-butadiene, 1,3-pentadiene (piperylene), 3-methyl-1,3-pentadiene, 1,3-heptadiene, 2-ethoxy-3-ethyl-1,3-butadiene, and 2-ethoxy-3-methyl-1,3-hexadiene. They can be polymerized alone or in admixture with each other to form copolymers. Block copolymers can be prepared from two or more conjugated dienes by charging one compound initially, allowing it to polymerize, and then adding a second conjugated diene and allowing it to polymerize.

In addition to the conjugated dienes, the invention can be practiced with other monomeric materials containing a

group such as the vinyl-substituted aromatic compounds. The vinyl-substituted aromatic compounds include styrene, 1-vinylnaphthalene, 2-vinylnaphthalene and the alkyl derivatives thereof such as alpha-methylstyrene, 3-methylstyrene (3-vinyltoluene), 4-n-propylstyrene, 4,5-dimethyl-1-vinylnaphthalene, and the like. These vinyl-substituted aromatic compounds can be used to form homopolymers or copolymers including block copolymers with each other or with conjugated dienes.

The organo-monolithium polymerization initiator acts on the monomer in the solvent medium over a broad range of conventional polymerization temperatures (see, for example, U.S. Pat. No. 3,135,716, Uranek et al., June 2, 1964, col. 4, lines 35–37) including ordinary ambient temperatures, to produce a living polymer anion which is terminated at one end by a lithium cation, that is, the living polymer is a monolithium polymer. As indicated previously, the living polymer is present in the hydrocarbon solvent medium in ionically associated form. If the living monolithio polymer were isolated at this stage, by quenching the polymerization reaction mix with alcohol or acid to destroy the living end of the polymer and removing the solvent, the polymer would be a solid, high polymeric substance, usually having a molecular weight of at least about 50,000.

For purposes of the invention, the amount of organo-monolithium initiator employed will ordinarily be from 0.1 to 2 millimoles, preferably from 0.25 to 1 millimole, per mole of total monomers.

In practicing the invention, a coupling agent is added to the polymerization mixture, at the conclusion of the polymerization reaction and while the living monolithio polymer is still present, that is, before quenching with alcohol or acid or otherwise destroying the active lithium-terminated polymer end. In accordance with the invention, the coupling agent is selected from the group consisting of nitrobenzene, sulfur, dimethyl terephthalate, an alpha, beta-unsaturated nitrile (e.g., acrylonitrile, methacrylonitrile, crotonic nitrile, vinylidene cyanide, dicyanoethylene, beta, beta-dimethyl acrylonitrile, alpha, beta, betatrimethyl acrylonitrile, cinnamonitrile, etc.) and a cyclic monoanhydride (e.g., maleic anhydride, succinic anhydride, malonic anhydride, adipic anhydride, phenyl succinic anhydride, glutaric anhydride, phthalic anhydride, citraconic anhydride, itaconic anhydride, mesaconic anhydride, pyrocinchonic [dimethyl maleic] anhydride, ethyl methyl maleic anhydride, tetrahydrophthalic anhydride, naphthalic anhydride, etc.) These coupling agents are characterized by the fact that they are capable of reacting more than once with an anion at the same site or substantially the same site (as distinguished for example from such coupling agents as certain dihalo compounds, in which the reactive sites are separated and which tend to produce chain termination unless limited to stoichiometric quantities.) The coupling agent is simply allowed to react with the living polymer, suitably under the same conditions as used for the polymerization reaction itself. As a result of the reaction between the coupling agent and the ionically associated living polymer anions, ends of polymer molecules become joined together, through the coupling agent, to form larger polymer molecules having a higher molecular weight than the original uncoupled living polymer molecules. A typical coupling reaction may be represented substantially as follows:

where P is a polymer and C is a coupling agent.

Depending on the coupling agent used, it is possible to obtain coupled polymer molecules which combine two, three or four of the original living polymer molecules. Thus, with nitrobenzene, sulfur, or the unsaturated nitrile coupling agent, two molecules of living polymer can be coupled. With dimethyl terephthalate as a coupling agent, since two carboxylate groups are present, formation of a tetramer is possible. With monoanhydride coupling agents, formation of a trimer is possible.

The present coupling process results in a relatively high coupling efficiency from the standpoint that a marked increase in molecular weight takes place.

The process is also efficient from the standpoint that an excess of coupling agent over the amount of catalyst charged may be employed without fear of substituting an undesired chain terminating reaction for the desired coupling reaction. There is usually employed from 0.25 to 20 equivalents, preferably from 1 to 10 equivalents, of coupling agent per equivalent of catalyst charged to the polymerization mixture.

The coupled polymeric product is thereafter recovered from the reaction mixture in essentially the same way that ordinary uncoupled polymer is conventionally recovered. This usually involves quenching the reaction mixture either with alcohol or acid. Antioxidant is usually added as well to protect the polymer in the recovery and drying operations.

The coupled polymer product resulting from the method of the invention is essentially devoid of reactive end groups, unlike the telechelic or semitelechelic polymers obtained in certain prior art processes. The telechelic polymers resulting from prior art processes (e.g., U.S. Pat. No. 3,177,190, Hsieh, Apr. 6, 1965) are cross-linkable with bifunctional agents which react with reactive end groups on the polymers, whereas the present products are non-reactive. Chain extension or cross-linking of telechelic polymers (from which the lithium end groups have already been displaced) by the action of bi- or tri-functional curing agents is distinct from the present coupling of living monolithio polymer directly prior to removal of the lithium. Such prior art cross-linking gives an insoluble cured product whereas the present coupled polymers are still soluble, uncured products.

It should be noted that if a polar solvent, such as an ether, is used the tendency is for a capping reaction to take place, to the detriment of the presently desired coupling reaction. It is believed that the significant difference between a non-polar compound versus a polar solvent resides in the fact that in the non-polar medium the living polymer anions are present essentially in ionically associated form. This is the form believed to take part in the present coupling reaction.

It is believed that the present coupling agents are covalent couplers and the polymers are covalent in nature.

An important advantage of the method of the invention resides in the fact that it is possible to greatly increase the productivity of a solution polymerization reactor, which is ordinarily restricted as to the permissible solids content of the polymerization solution and/or as to the permissible molecular weight (viscosity) of the polymer, because of mechanical limitations of the agitation equipment and heat transfer limitations (the polymerization being an exothermic reaction which on an industrial scale requires removal of prescribed quantities of heat). Unlike the polymerization reaction, the coupling reaction is not exothermic. Therefore, the viscosity of the solution in the coupling reaction can be permitted to go substantially higher (because there is no heat transfer problem) than would ordinarily be desirable in a polymerization reaction. The result in effect is to increase the capacity of the polymerization apparatus beyond its normal design capacity considered purely as a polymerization vessel.

It is also possible to transfer the polymer solution to be coupled, from the polymerization vessel into a simple vessel for the coupling reaction. The coupling vessel need not be the relatively complicated and expensive vessel, such as a scraped surface reactor with high heat transfer capabilities, normally used in exothermic solution polymerizations. This frees the polymerization reactor for a second batch of polymer sooner than would otherwise be possible if a purely polymerization reaction, as distinguished from coupling, were relied upon to produce a polymer solution of solids content and viscosity equivalent to that of the coupled product.

In a continuous system, typically involving a series of reactors or zones through which the reactants are passed successively, it is possible to employ fewer or smaller polymerization zones, associated with a simpler coupling reactor or zone, than would ordinarily be required to produce the same quantity of a final polymer solution of the same solids content and viscosity by conventional polymerization.

Another important advantage of the invention pertains particularly to the manufacture of block copolymers, wherein conventional practice in preparing a styrene-butadiene-styrene block copolymer for example would require a three stage polymerization involving first polymerizing styrene to form a polystyrene block (S) then adding butadiene monomer to add on a polybutadiene block (B), and finally adding a third charge of monomer, styrene, to add on the final polystyrene block (S) thus forming the desired block copolymer (SBS). In addition to the complexity involved in a three stage polymerization, difficulty can be experienced particularly in the third stage from undesired premature termination of the living $SB^{\ominus}Li^{\oplus}$ polymer by impurities commonly introduced with the third monomer charge. The present process can avoid this third stage polymerization by coupling the living polymer molecules $SB^{\ominus}Li^{\oplus}$ with a novel coupling agent C to form a block copolymer of the SBCBS type without charging more monomer.

In the prior art, production of branched polymers required the use of polyfunctional materials with at least three active sites (U.S. Pat. No. 3,281,383, Zelinski et al., Oct. 25, 1966). In the present invention, branched polymers can be prepared from cheap materials, monoanhydrides or dimethyl terephthalate, with no difficulty.

Using the method of the invention, polybutadienes having reduced cold flow can be produced.

Various forms of coupled polymer may be represented by the formula

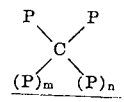

where P is the original uncoupled polymer (such as styrene-butadiene block copolymer, SB), C is the residue of the coupling agent, n and m are zero when the coupling agent acts bifunctionally, m is 1 and n is zero when the coupling agent acts trifunctionally, and m and n are 1 when the coupling agent acts tetrafunctionally. Formation of branched species (m and/or n are 1) is favored by using the higher functionality coupling agents (maleic anhydride, dimethyl terephthalate) in less than a stoichiometrically excess amount.

The following examples will serve to illustrate the practice of the invention in more detail.

EXAMPLE I

This example illustrates the preparation of a coupled styrene-butadiene block copolymer which is a thermoplastic elastomer of the SBS type. Three hundred ml. of dry, air-free benzene is added to a clean, dry, cappable bottle under an argon atmosphere. To this solvent is added 10.0 grams of carefully purified styrene (0.096 mole). The bottle is then capped with a metal cap having holes punched in the top and having placed inside it a rubber disc and a teflon disc. At this point, 0.25 ml. (0.4 mmole) of a 15 percent n-butyl lithium solution in hexane is injected with a hypodermic syringe. In a short while polymerization begins (as evidenced by a temperature rise from room temperature to about 50° C.) and is allowed to proceed overnight to form a polystyrene block. After approximately 16 hours, 30.0 grams (0.556 mole) of butadiene is injected through the gaskets from a pressure bomb, and again the reaction is allowed to proceed overnight, forming a polybutadiene block copolymerized with the polystyrene block. The styrene-butadiene block copolymer thus formed has a molecular weight of approximately 100,000; it exists in the solution as a living monolithio polymer $SB^{\ominus}Li^{\oplus}$. The next day, 2 ml. of a 0.1M benzene solution of nitrobenzene (0.2 mmole) is injected into the living polymer solution as a coupling agent. The reaction again is allowed to proceed overnight. The reaction mixture is then quenched with 5 ml. of a 5 percent solution of antioxidant [Santowhite Crystals, 4,4'-thiobis (6-t-butyl-m-cresol] in methanol. The bottle is then uncapped and the polymer is flocculated in methanol containing antioxidant. The polymer is filtered off and dried at 35° C. in a vacuum oven for 2 days. The resulting polymer is a snappy thermoplastic material, and is a block copolymer of the form SBCBS where C is a residue of the coupling agent, nitrobenzene.

For comparison, another batch of the living monolithio block copolymer solution may be treated with 5 ml. (0.08 mole) of acetic acid rather than with nitrobenzene, to cap the polymer with a proton and thus provide a non-coupled molecule for comparison. This non-coupled polymer product may be worked up identically. The resulting SB block copolymer is a waxy, brittle material.

The data in Table I typifies the differences between properties of the two polymers.

TABLE I

Styrene-Butadiene Block Copolymer With and Without Coupling Agent

|  | Coupled | Non-Coupled |
| --- | --- | --- |
| Intrinsic viscosity (in toluene, 30°) | 2.26 | 1.21 |
| Molecular weight (Mn) | 20×10⁴ | 11.9×10⁴ |

EXAMPLE II

This example illustrates the coupling of styrene-isoprene block copolymers, using various coupling agents of the invention. The block copolymerizations are carried out exactly as in Example I, with the exception that 30 g. (0.43 mole) of isoprene is added instead of butadiene. Dimethyl terephthalate and maleic anhydride are used as coupling agents for treating the block polymer solutions, as shown in Table II, which includes, for comparison, a run in which no coupling was carried out but instead the block copolymer was capped by adding acetic acid (Run A).

TABLE II

Styrene-Isoprene Block Copolymer With Various Coupling Agents

|  | A | B | C | D |
| --- | --- | --- | --- | --- |
| Coupling Agent | none | DMT⁽¹⁾ | MA⁽²⁾ | DMT |
| Mmoles | – | 1.5 | 1.5 | 1.0 |
| Hardness (Shore A) | 9 | 32 | 31 | 36 |
| Tensile Strength (psi) | 10 | 1640 | 1345 | 2150 |
| Elongation (%) | 240 | 1090 | 1110 | 1180 |
| Modulus 300% (psi) | – | 135 | 110 | 135 |
| Intrinsic viscosity | 0.84 | 0 | 1.35 | 1.32 |
| Molecular Weight (Mn×10⁻⁴) | 9.4 | – | – | 19.9 |

⁽¹⁾dimethyl terephthalate
⁽²⁾maleic anhydride

EXAMPLE III

Styrene-butadiene copolymers are prepared exactly as in Example I, except that the coupling agent is either sulfur (S) or nitrobenzene ($\phi NO_2$), in the amounts shown in Table III, to produce high molecular weight materials.

TABLE III

Styrene-Butadiene Block Copolymer Coupled With Sulfur (S) or Nitrobenzene (ONO₂)

| Run | | | | |
| --- | --- | --- | --- | --- |
| Coupling Agent | S | S | ONO₂ | ONO₂ |
| Amount *(ml) | 4 | 20 | 1 | 4 |
| Mmoles | 0.4 | 2.0 | 0.1 | 0.4 |
| Molecular Weight before Coupling (Mn×10⁻⁴) | 10.5 | 14.1 | – | – |
| Mn×10⁻⁴ after Coupling | 20.3 | 30.6 | 27.5 | 24.0 |
| I.V. after Coupling | 2.01 | 2.08 | 2.29 | 2.26 |

*As a 0.1M solution in dry benzene

EXAMPLE IV

This example illustrates the coupling of living monolithio-polybutadiene, using coupling agents of the invention. Also illustrated by this example is the manner in which the presence of even a small amount of polar solvent in the medium markedly decreases the coupling.

Part A. Three hundred ml. of dry, air-free benzene is added to each of a series of clean, dry cappable bottles under an argon atmosphere. As in Example I, the bottles are then capped with metal caps having holes punched in the top and having placed inside a rubber gasket and a teflon gasket. At this point, 0.5 ml. (0.8 mmole) of a 15 percent butyl lithium solution in hexane is injected into each bottle with a hypodermic syringe. To this solution is added in each bottle 30 grams (0.556 mole) of butadiene from a pressure bomb. In a short while polymerization begins, and is allowed to proceed overnight. The next day, a coupling agent of the invention is injected into each bottle as follows:

| Coupling Agent | Amount (mmoles) |
| --- | --- |
| nitrobenzene(ONO₂) | 2.4 |
| sulfur | 2.4 |
| dimethyl terephthalate (DMT) | 1.2 |
| maleic anhydride (MA) | 2.4 |
| acrylonitrile (A) | 2.4 |

The action of the coupling agent on the living monolithio polybutadiene polymer is allowed to proceed overnight. The cements are then quenched with 5 ml. of a 5 percent solution of Santowhite Crystals in methanol. The bottles are then uncapped and the polymers are flocculated in methanol containing antioxidant. The polymer is filtered off and dried at 35° C. in a vacuum oven for two days.

Part B. The entire series of runs is repeated as in Part A, except that 5 ml. of a polar solvent, tetrahydrofuran, is injected into each bottle 1 hour prior to the addition of the coupling agent. The remainder of the procedure is otherwise the same as in Part A.

Molecular weight data are obtained on a sample of every polymer, before the coupling agent and tetrahydrofuran are added, and on the final products. A summary of the data is presented in Table IV, wherein $Mn_1$ is the molecular weight ($\times 10^{-4}$) of an aliquot of polybutadiene before tetrahydrofuran and/or coupling agent are added, and $Mn_2$ is the molecular weight ($\times 10^{-4}$) of the polymer after reacting 1 day with the coupling agent either in the presence or absence of tetrahydrofuran.

TABLE IV

Effect of Solvent on Coupling Reaction of Living Polybutadiene

| | Without Tetrahydrofuran | | | With Tetrahydrofuran | | |
|---|---|---|---|---|---|---|
| Reagent | $Mn_1$ | $Mn_2$ | Mn Increase (%) | $Mn_1$ | $Mn_2$ | Mn Increase (%) |
| $ONO_2$ | 4.2 | 7.56 | 80 | 4.94 | 8.05 | 62.5 |
| S | 4.55 | 7.84 | 72.4 | 5.28 | 6.17 | 16.9 |
| DMT | 4.22 | 9.07 | 115 | 4.71 | 6.83 | 47 |
| MA | 4.27 | 10.9 | 155 | 4.94 | 7.33 | 48.4 |
| A | 4.27 | 8.39 | 96.5 | 5.43 | 7.97 | 46.8 |

EXAMPLE V

This example illustrates a pilot plant run in which styrene-butadiene block copolymer is coupled with the aid of a coupling agent of the invention, namely, dimethyl terephthalate. To a 5-gallon reactor is added 800 grams (7.69 moles) of carefully purified styrene and 6,000 grams of dry benzene and the mixture is heated to 120° F. A solution (72 ml.) of butyl lithium (15 percent) catalyst in hexane is added in 5 ml. increments until the polymerization reaction starts as evidenced by an exotherm. At this point 18.5 ml. of the catalyst solution is added (making a total of 29.6 millimoles of catalyst) and the polymerization of the styrene is allowed to run to completion (about 24 hours) as determined by measuring the solids content of a sample withdrawn from the reactor.

To a 10-gallon reactor is added 2,400 grams of butadiene (44.5 moles) and 17,000 grams of benzene and the mixture is heated to 120° F. A solution (70 ml., 112 mmoles) of butyl lithium catalyst (15 percent) in hexane is added in increments until an exotherm is noted. The contents of the 5-gallon reactor at ambient conditions are then passed rapidly into the 10-gallon reactor and the solution is allowed to cool to room temperature. To the resulting solution of living monolithio styrene-butadiene block copolymer, SB⊖Li⊕, is added 140 ml. of a 0.1 M solution in benzene of dimethyl terephthalate (14 mmoles) as a coupling agent. The reaction is allowed to proceed overnight with stirring, and is then quenched by the addition of 100 g. of stearic acid and 20 g. of antioxidant [2,2'-methylene-bis (4-methyl-6-t-butylphenol)]. The polymer is flocculated in isopropanol (20 gallons)-antioxidant (100 g.) solution. The polymer is dried in a vacuum oven. The physical properties of this coupled thermolastic styrene-butadiene block copolymer are as follows:

I. V., 1.72

Mn before coupling agent added, $9.12 \times 10^4$
Mn 1 hour after coupling agent added, $15.9 \times 10^4$
percent styrene, 27

Having thus described our invention, what we claim and desire to protect by Letters Patent is:

1. A method of preparing a polymer comprising in combination the steps of
   a. providing vinyl-containing monomeric material which is polymerizable in solution by the action of an organo-monolithium polymerization catalyst, said monomeric material being at least one monomer selected from the group consisting of conjugated dienes having from four to 12 carbon atoms per molecule and vinyl-substituted aromatic compounds,
   b. providing a polymerization catalyst which is an organo-monolithium compound of the formula RLi where R is a hydrocarbon radical selected from the group consisting of aliphatic, cycloaliphatic and aromatic radicals, the amount of said catalyst being from 0.1 to 2 millimoles per mole of said monomeric material,
   c. bringing said monomeric material and catalyst together in an inert organic solvent medium which is a hydrocarbon solvent whereby a monolithio polymer which is a living polymer terminated with lithium is formed, the living monolithio polymer being present in solution in ionically associated form,
   d. providing in said living monolithio polymer solution a coupling agent selected from the group consisting of nitrobenzene and an alpha, beta-unsaturated nitrile, the amount of said coupling agent being 0.25 to 20 equivalents per equivalent of lithium catalyst, whereby said living polymer molecules become joined together by said coupling agent to form higher molecular weight polymer.

2. A method as in claim 1 in which the said coupling agent is an alpha, beta-unsaturated nitrile.

3. A method as in claim 2 in which the said alpha, beta-unsaturated nitrile is acrylonitrile.

4. A method of preparing a polymer comprising in combination the steps of
   a. providing vinyl-containing monomeric material which is polymerizable in solution by the action of an organo-monolithium polymerization catalyst, said monomeric material being at least one monomer selected from the group consisting of conjugated dienes having from four to 12 carbon atoms per molecule and vinyl-substituted aromatic compounds,
   b. providing a polymerization catalyst which is an organo-monolithium compound of the formula RLi where R is a hydrocarbon radical selected from the group consisting of aliphatic, cycloaliphatic and aromatic radicals, the amount of said catalyst being from 0.1 to 2 millimoles per mole of said monomeric material,
   c. bringing said monomeric material and catalyst together in an inert organic solvent medium which is a hydrocarbon solvent whereby a monolithio polymer which is a living polymer terminated with lithium is formed, the living monolithio polymer being present in solution in ionically associated form,
   d. providing nitrobenzene in said living monolithio polymer solution as a coupling agent, the amount of said coupling agent being 0.25 to 20 equivalents per equivalent of lithium catalyst, whereby said living polymer molecules become joined together by said coupling agent to form higher molecular weight polymer.

5. A method as in claim 4 in which the said R is alkyl.

6. A method as in claim 5 in which the said catalyst is n-butyl lithium.

7. A method of making a block copolymer of styrene and butadiene comprising in combination the steps of
   a. providing an inert organic solvent polymerization medium which is a hydrocarbon solvent,
   b. providing a polymerization catalyst which is an organo-monolithium compound of the formula RLi where R is a hydrocarbon radical selected from the group consisting of aliphatic, cycloaliphatic and aromatic radicals, c. bringing styrene and butadiene successively into contact with said catalyst in said medium, the amount of catalyst being from 0.1 to 2 millimoles per mole of said monomers, to form a living block copolymer of styrene and butadiene in the form of a living monolithio polymer of the formula SB⊖Li⊕ where S is a block of polystyrene and B is a block of polybutadiene, the copolymer being present in the solution in ionically associated form, d. providing nitrobenzene in said living monolithio copolymer solution as a coupling agent, the amount of said coupling agent being 0.25 to 20 equivalents per equivalent of lithium catalyst, whereby said living polymer molecules become joined together through said coupling agent to form higher molecular weight polymer.

8. A method as in claim 7 in which the said R is alkyl.

9. A method as in claim 8 in which the said catalyst is n-butyl lithium.

10. A method of making block copolymer of styrene and isoprene comprising in combination the steps of a. providing an inert organic solvent polymerization medium which is a hydrocarbon solvent, b. providing a polymerization catalyst which is an organomonolithium compound of the formula RLi where R is a hydrocarbon radical selected from the group consisting of aliphatic, cycloaliphatic and aromatic radicals, c. bringing styrene and isoprene successively into contact with said catalyst in said medium, the amount of catalyst being from 0.1 to 2 millimoles per mole of said monomers, to form a living block copolymer of styrene and isoprene in the form of a living monolithio polymer of the formula SI⊖Li⊕ where S is a block of polystyrene and I is a block of polyisoprene, the copolymer being present in the solution in ionically associated form, d. providing nitrobenzene in said living monolithio copolymer solution as a coupling agent, the amount of said coupling agent being 0.25 to 20 equivalents per equivalent of lithium catalyst, whereby said living polymer molecules become joined together through said coupling agent to form higher molecular weight polymer.

11. A method as in claim 10 in which the said R is alkyl.

12. A method as in claim 11 in which the said catalyst is n-butyl lithium.

* * * * *